United States Patent
Charters et al.

(10) Patent No.: US 6,577,799 B1
(45) Date of Patent: Jun. 10, 2003

(54) LASER DIRECT WRITING OF PLANAR LIGHTWAVE CIRCUITS

(75) Inventors: Robbie Charters, Giralang (AU); Barry Luther-Davies, Kambah (AU); Francois Ladouceur, Berlin (DE)

(73) Assignee: The Australian National University (AU)

( * ) Notice: Subject to any disclaimer, the term of this patent is extended or adjusted under 35 U.S.C. 154(b) by 0 days.

(21) Appl. No.: 09/720,802

(22) PCT Filed: Jul. 2, 1999

(86) PCT No.: PCT/AU99/00540

§ 371 (c)(1),
(2), (4) Date: Mar. 2, 2001

(87) PCT Pub. No.: WO00/02073

PCT Pub. Date: Jan. 13, 2000

(30) Foreign Application Priority Data

Jul. 3, 1998 (AU) ................................. 4465/98

(51) Int. Cl.$^7$ ............................. G02B 6/00; G02B 6/02
(52) U.S. Cl. ........................ 385/123; 439/290; 359/627
(58) Field of Search .................... 359/362–367, 359/619, 627, 216, 212, 223, 226, 558, 17, 18; 385/121–125, 147, 130, 145; 430/97, 56, 124, 19, 21, 321, 495, 945, 290

(56) References Cited

U.S. PATENT DOCUMENTS

| | | | | |
|---|---|---|---|---|
| 4,847,132 A | * | 7/1989 | Takao et al. | 369/283 |
| 5,054,872 A | * | 10/1991 | Fan et al. | 385/130 |
| 5,194,349 A | * | 3/1993 | Tsuo et al. | 346/135.1 |
| 5,315,427 A | * | 5/1994 | Rauch et al. | 359/216 |
| 5,629,805 A | * | 5/1997 | Fukuzawa | 355/53 |

FOREIGN PATENT DOCUMENTS

JP  2-52724 A  2/1990

OTHER PUBLICATIONS

M. Svalgaard, *Direct Writing of Planar Waveguide Power Splitters and Directional Couplers Using a Focused Ultra-violet Laser Beam*, Electronic Letters, vol. 33, No. 20, pp. 1694–1695, 1997. (No mo/date).

L. Eldada, L.W. Shacklette, R.A. Norwood and J.T. Yardley, *Next–Generation Polymer Photonic Devices, Sol–Gel and Polymer Photonic Devices*, SPIE vol. CR68, pp. 207–227, 1997. (No mo/date).

N.R. Heckenberg, R. McDuff, C.P. Smith and A.G. White, *Generation of Optical Phase Singularities by Computer-Generated Holograms*, Optics Letters, vol. 17, No. 3, pp. 221–223, 1992. (No mo/date).

ACOFT'98 Proceedings: 23$^{rd}$ Australian Conference on Optical Fibre Technology, Jul. 5–8, 1998 (IREE Society, Sydney), R. Charters et al., "Laser Direct Writing of Polymeric PLC's using a TEM$_{10}$ * Beam", pp. 37–40.

* cited by examiner

*Primary Examiner*—Akm E. Ullah
(74) *Attorney, Agent, or Firm*—Nixon Peabody LLP; Donald R. Studebaker (57) ABSTRACT

A laser beam with an annular or ring shaped intensity distribution, such as a TEM$_{01}$* beam, is scanned across the surface of a photosensitive thin film to directly produce changes of refractive index in selected regions of the film. This method is suitable for producing channel waveguides for planar lightwave circuits, where the refractive index profile (solid curve) of such a waveguide is more uniform than the prior art refractive index profile (dashed curve) produced by a TEM$_{00}$ laser beam, and has a reduced bend loss.

9 Claims, 6 Drawing Sheets

LASER DIRECT WRITING OF PLANAR LIGHTWAVE CIRCUITS

FIELD OF THE INVENTION

This invention relates to the production of planar lightwave circuits (PLC's). More particularly, the invention relates to a method for defining the light wave circuit or components of the circuit by direct photoinduced changes in refractive index of a thin film forming the basis of the PLC.

BACKGROUND ART

There is an increasing demand for planar lightwave circuits for advanced optical communications networks, optical sensing and also as the basis of other photonic devices, such as high frequency signal processors for use in military and other applications.

Figure 1:
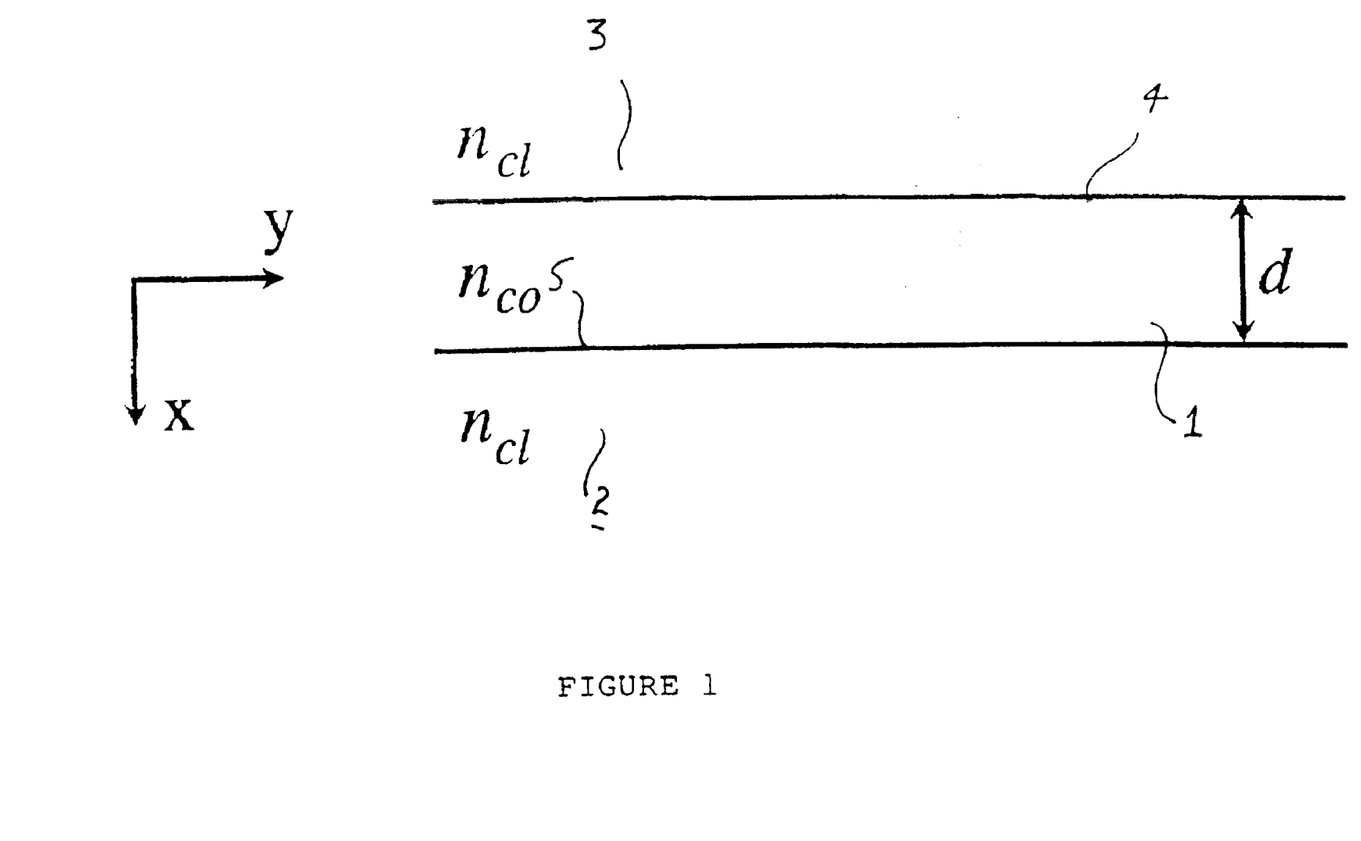
FIG. 1 is a schematic illustration of a planar waveguide.

The basis of most PLC's is a trilayer of optically transparent thin films deposited on a substrate of generally silicon or silica as shown in FIG. 1. The central, or core layer 1 of the sandwich structure normally has higher refractive index $n_{c0}$ than the refractive index $n_{c1}$ of outer cladding layers 2, 3, and this simple system is known as a planar waveguide. Light injected into the core layer undergoes total internal reflection at both core/cladding boundaries 4, 5 and is confined in this transverse dimension, resulting in 1-dimensional light guidance. However as a consequence of the constant refractive index in the plane of the film total internal reflection is not possible, and light spreads or diffracts laterally in the guiding layer. To impart useful functionality to a planar waveguide, 2-dimensional light guidance is required, and planar diffraction must be overcome by introducing local changes in the core layer refractive index. The light guides so formed are known as channel waveguides, the basic elements of PLC'S, and the final product is a planar lightwave circuit which can exhibit a wide range of optical functions. An example of a simple device is a concatenated Y-junction splitter where the signals from a single input channel are split evenly into a larger number of output channels independent of wavelength.

Currently, there are several classes of materials and processing methods which can be used to produce planar waveguides. These include silica glass (using plasma enhanced chemical vapour deposition: PECVD, or flame hydrolysis: FHD); organically modified silicate glasses (ORMOSILs) and plastics produced via wet chemical synthesis and spin coating; and III–V semiconductors produced by MOCVD or MBE growth.

The waveguides in the PLC are defined by structuring or patterning of the refractive index in the plane of the film. In the microelectronics industry, the standard patterning technique is known as mask photolithography. The first step in this process is to deposit an additional thin film of photo resist onto the planar waveguide core, usually by spin coating. The photo resist film is then preferentially exposed to a broadband extended UV source through an amplitude mask such that a photochemical reaction is initiated below the high transmission areas of the mask. The photochemical reaction changes the solubility of the photo resist enabling it to be removed by agitation in a suitable solvent. Depending on whether negative or positive tone resist is used, the irradiated regions will remain or be removed respectively. The photo resist pattern may then be transferred to the waveguide core layer by removing core material from the unwanted regions by a process such as reactive ion etching. Removal of the remaining resist and over cladding with a low refractive index film completes the standard processing of the PLC. Two dimensional waveguiding is therefore achieved through selective removal of the high index core material.

As an alternative to the photo resist technology, materials such as plastics, ormosils and some glasses can allow refractive index patterning to be achieved without the use of an additional photo resist layer. In this class of materials, direct exposure generally to UV radiation initiates a photochemical reaction that raises the refractive index of the core material, enabling channel waveguides to be formed. The materials are generically described as photosensitive. The use of mask photolithography on these films therefore results in the production of PLC'S without the requirement for the deposition of an additional photo resist layer or any reactive ion etching or wet development.

The production of a suitable mask is however costly and time consuming and, particularly in the prototyping stage, limits the number of device designs that can be tested. Recently it has been demonstrated that the requirement for a mask can be eliminated by using the laser direct writing (LDW) technique. This is described in M. Svalgaard, 'Direct writing of planar waveguide power splitters and directional couplers using a focused ultraviolet laser beam', *Electronics Letters*, Vol. 33, No. 20, pp. 1694–1695, 1997. In contrast to standard mask photolithography, in the LDW process the photosensitive planar waveguiding film is accurately traversed under a focused laser beam to locally expose the material and directly delineate the channel waveguides without the use of a mask. The LDW process is very versatile and permits a wider range of structures than is generally possible by exposure through a mask. For example, using a mask the exposure will be uniform across the whole wafer, and hence the refractive index change obtained cannot vary from one part of the waveguide structure to the next. Using LDW, on the other hand, permits the exposure, and hence the induced change of the refractive index, to be adjusted even over short distances permitting a wider range of waveguide structures to be written. Furthermore, the LDW process permits the waveguide pattern to be changed from wafer to wafer because the generated pattern can be under direct software control.

As with mask photolithography, depending on the waveguide material used, the laser induced photochemical reaction can either directly induce a refractive index change in the waveguiding material without further processing, the material system can be locally exposed and then subjected to wet development, or a secondary layer of photo resist may be used and the photo resist pattern transferred to the waveguiding core layer. Therefore depending on the laser source, the process is applicable to many different material systems e.g. glass, polymer, sol-gel, Ti:LiNbO$_3$. In addition, the use of high power lasers and/or different laser wavelengths can access photosensitive mechanisms that cannot be attained with mask photolithography.

Figure 2:
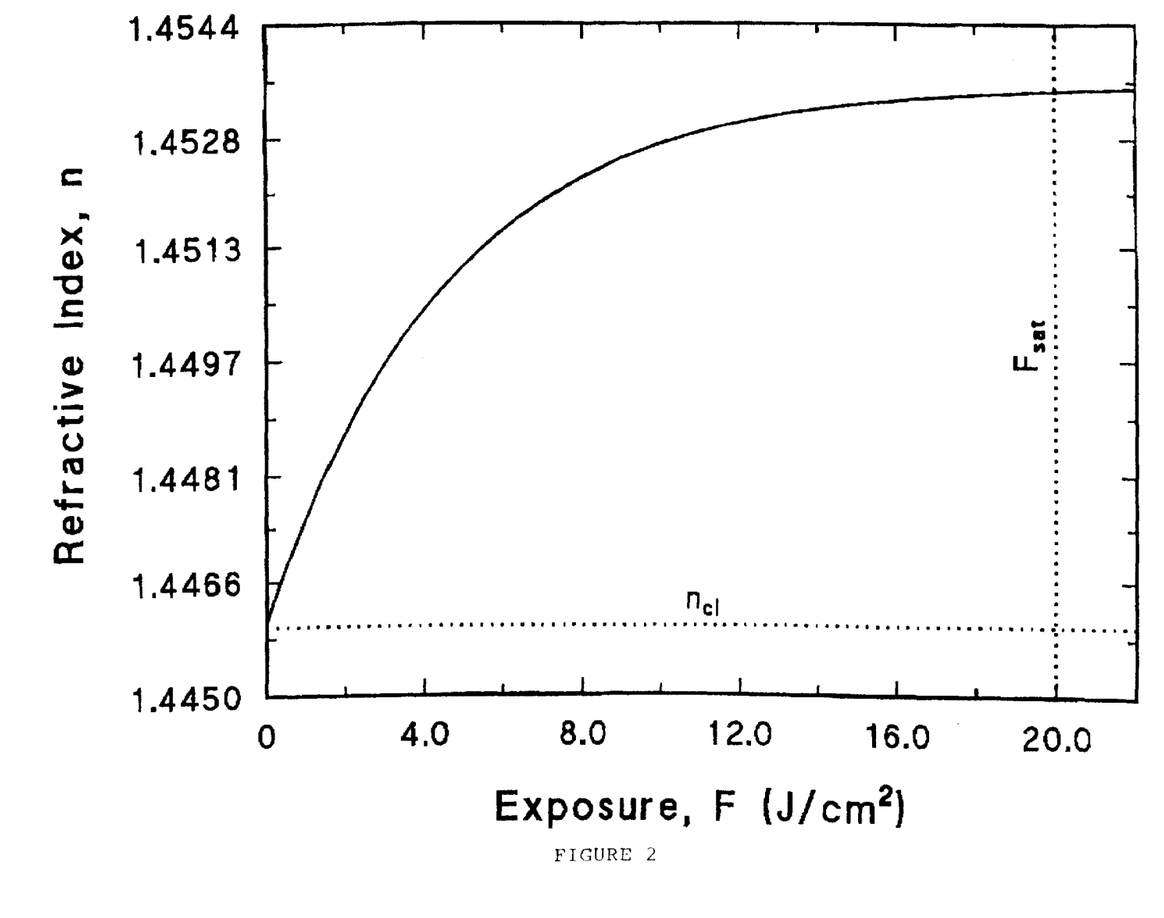
FIG. 2 illustrates the typical refraction index response of a photosensitive medium as a function of exposure to electromagnetic radiation.
Figure 3:
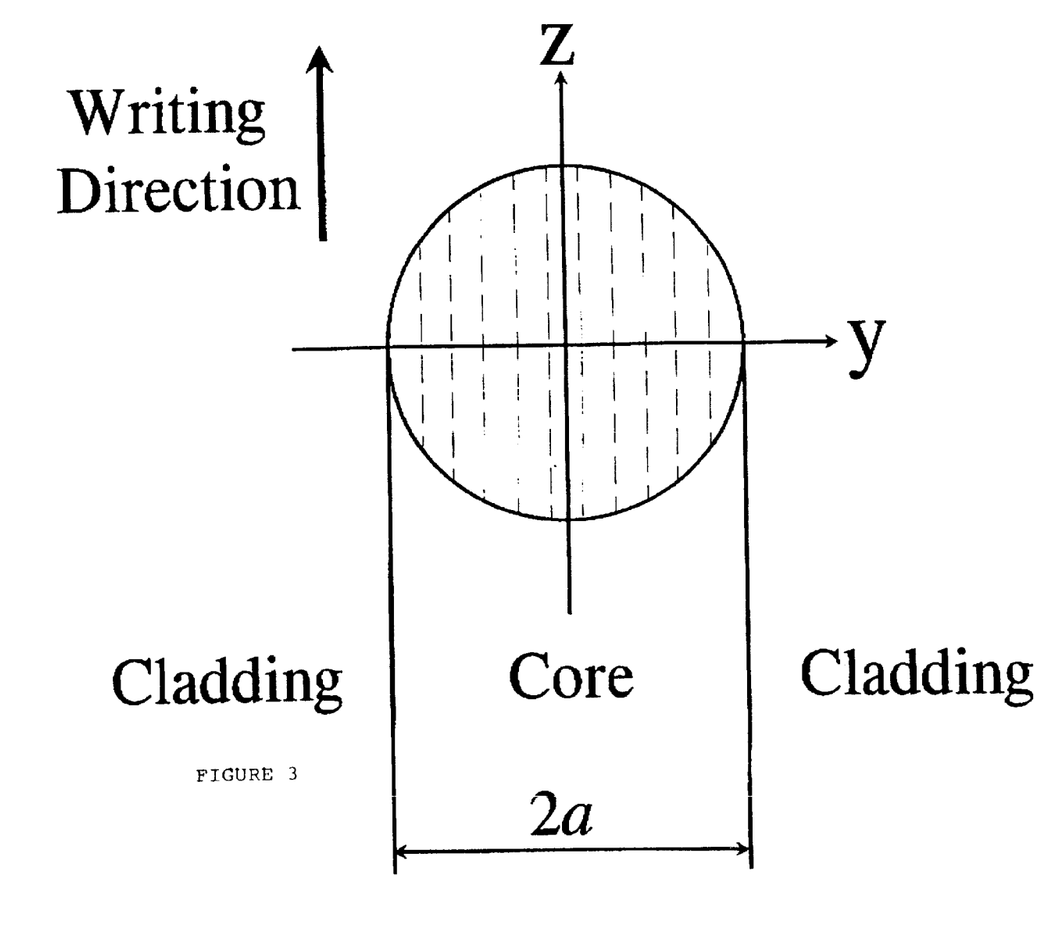
FIG. 3 is a schematic planar view of a laser circuit writing process used in the method of this invention.
Figure 4:
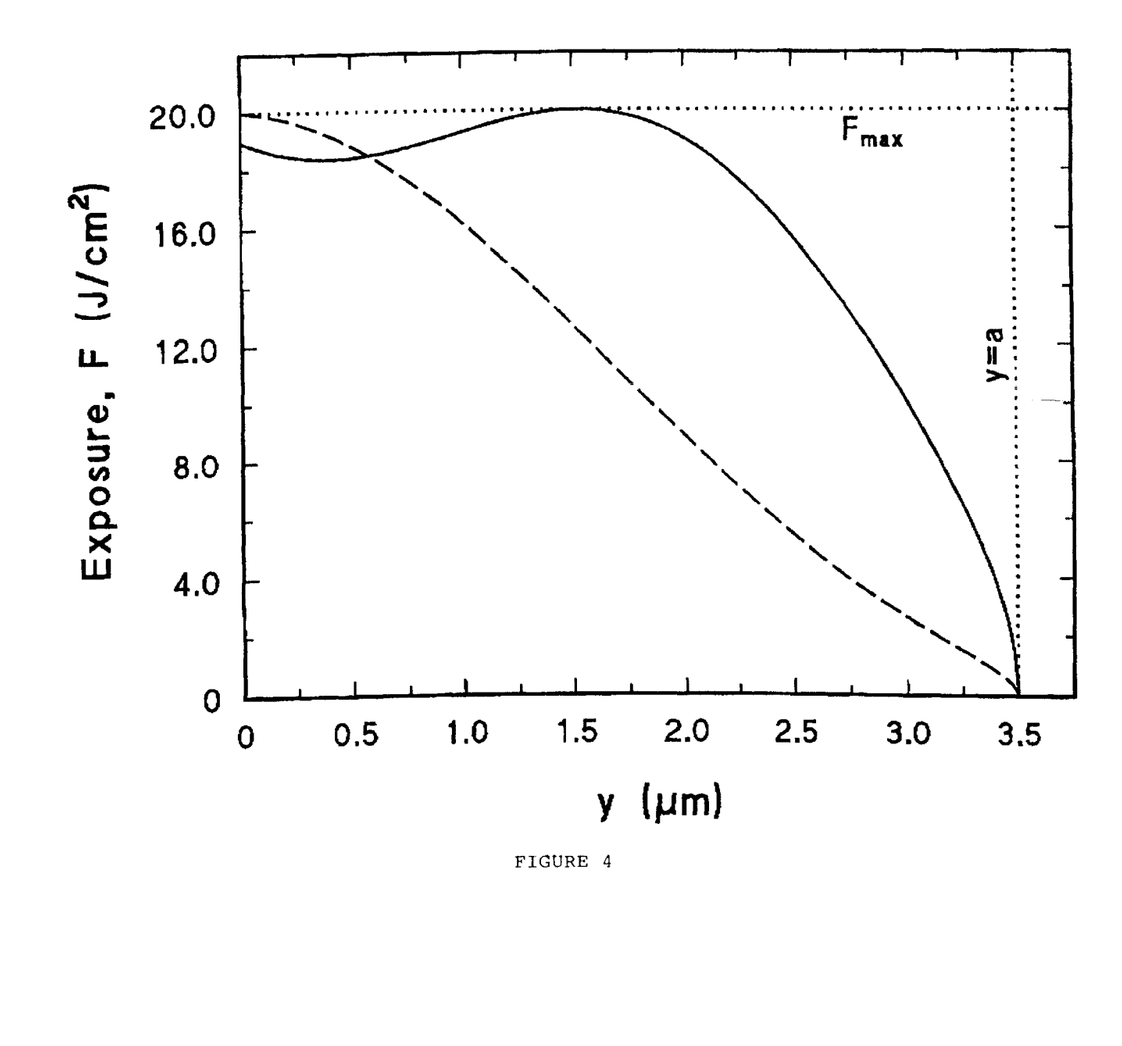
FIG. 4 illustrates the lateral exposure function of $TEM_{01}*$ (solid line) and $TEM_{00}$ (dashed line) for equal maximum exposure writing scenarios.
Figure 5:
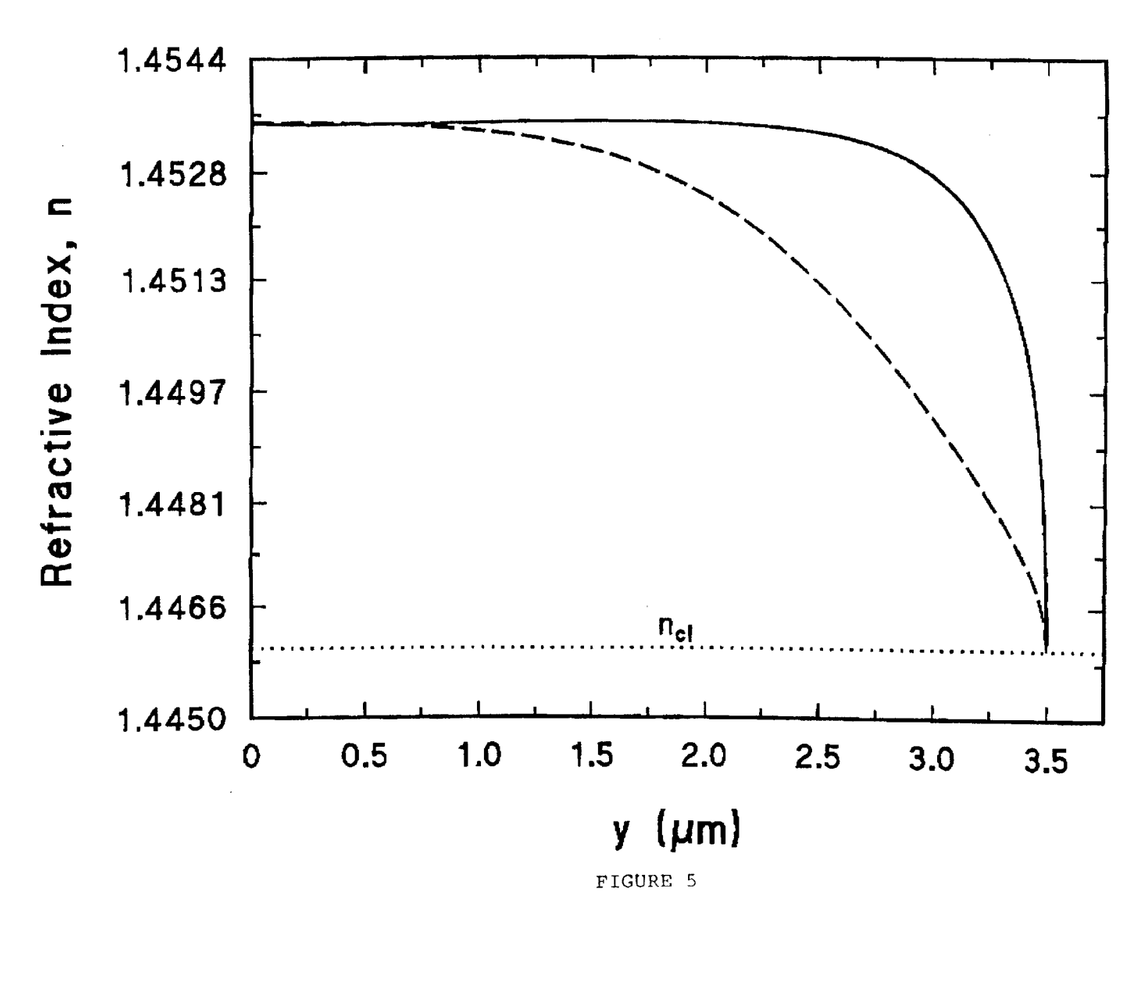
FIG. 5 illustrates the lateral refraction index distribution for $TEM_{01}*$ (solid line) and $TEM_{00}$ (dashed line) for equal maximum exposure writing scenarios.

In general the refractive index, n, of a photosensitive material is dependent on it's exposure, F, to electromagnetic radiation, and as shown in FIG. 2 the material response function, n(F), typically exhibits a saturation behaviour up to a maximum exposure, $F_{sat}$. A plan view of the laser writing process is shown in FIG. 3, where we consider delineation of a channel waveguide of width $2a$ in the z direction. For a laser irradiance distribution, I(y,z), the lateral exposure of the material in the y direction, F(y), is given by;

$$F(y) = \frac{1}{v} \int_{-\sqrt{a(a-y)}}^{\sqrt{a(a-y)}} I(y,z) \, dz \qquad (1)$$

where v is the writing velocity. The lateral exposure, $F(y)$, for a truncated (beam waist, w=a) $TEM_{00}$ beam with irradiance distribution $I(y,z)=I_{00} \exp(-2(y^2+z^2)/w^2)$, is shown by the dashed line in FIG. 4. Clearly the exposure is peaked around y=0. For optimum use of the available refractive index change the maximum lateral exposure, $F_{max}$ should equal the material saturation exposure, $F_{sat}$. Taking into account the material response n(F), the corresponding refractive index distribution n(y) also shows a maximum at y=0 as shown by the dashed line in FIG. 5. Laser direct write systems so far have employed the focusing or imaging of weakly truncated Gaussian ($TEM_{00}$) beams, and operating under this scenario therefore produce channel waveguides with laterally graded refractive index profiles. Indeed, graded thickness profiles are often observed in wet developed polymer waveguides. This is described in L. Eldada, L. W. Shacklette, R. A. Norwood and J. T. Yardley, 'Next-generation polymer photonic devices', *Sol-Gel and Polymer Photonic Devices*, SPIE Vol. CR68, pp. 207–227, 1997. Graded index profiles have some disadvantages when factors such as bend loss and form birefringence are taken into account.

DISCLOSURE OF THE INVENTION

It is an object of this invention to provide a method of directly producing photoinduced changes in refractive index that provides a more uniform lateral refractive index distribution.

Accordingly, in one broad aspect this invention provides a method of directly producing photoinduced changes in refractive index in selected regions of a photosensitive thin film by selectively scanning a laser beam across the surface of the film, characterised in that the laser beam impinging the film has an annular substantially circularly symmetric irradiation intensity distribution.

As used herein the term annular intensity distribution includes any transverse intensity distribution that has a very low or zero intensity in a central region and a surrounding region of higher intensity. The radial intensity distribution within the surrounding region can be substantially uniform or may vary. This type of intensity distribution is sometimes referred to as a "doughnut type" distribution. Such a distribution is achieved, for example, by a $TEM_{01}*$ laser beam although higher order modes can also produce an intensity distribution having similar characteristics. The $TEM_{01}*$ is a hybrid mode consisting of a superposition of $TEM_{01}$ and $TEM_{10}$ with a constant phase difference of $\pm \pi/2$. The radial intensity distribution in a $TEM_{01}*$ beam is given by $$I(y,z) = I_{01} \left( \frac{y^2}{w_1^2} + \frac{z^2}{w_2^2} \right) \exp\left( -2\left( \frac{y^2}{w_1^2} + \frac{z^2}{w_2^2} \right) \right) \qquad (2)$$

where $w_1$ and $w_2$ are beam waists and $w_1 \approx w_2$

In the preferred form of the invention a $TEM_{01}*$ laser beam is used. The beam, for example, can be generated from a Gaussian laser beam by a diffracting phase mask technique as described in N. R. Heckenberg, R. McDuff, C. P. Smith and A. G. White, 'Generation of optical phase singularities by computer-generated holograms', *Optics Letters*, Vol. 17, No. 3, pp. 221–223, 1992. A $TEM_{01}*$ beam can also be produced directly from a laser by suitable modification to the cavity optics.

The use of a beam with an annular or doughnut type irradiance distribution results in a lateral exposure $F(y)$ that produces a more uniform lateral refractive index distribution, $n(y)$. This is achieved because $I(y,z)$ is modified such that the contribution to the integral in equation (1) near y=0 is reduced. In addition, to avoid introducing a preferential writing direction the focused beam must remain substantially circularly symmetric.

The invention will be further explained, by way of example only, with reference to the accompanying.

BEST MODE FOR CARRYING OUT THE INVENTION

The method of this invention utilises a laser direct write (LDW) technique in which a focussed $TEM_{01}*$ laser beam is used. The LDW technique is known to those skilled in the art and will not be described in detail.

The $TEM_{01}*$ 'doughnut mode' has an irradiance distribution which exhibits zero intensity at the beam centre. The maximum exposure is constrained to be equal to the material saturation exposure and results in the lateral refractive index distribution as shown in FIG. 5. The laser writing with a $TEM_{01}*$ beam gives a larger photoinduced refractive index change in the outer regions of the beam than that obtained with a $TEM_{00}$ counterpart of equal $F_{max}$. Furthermore, the change of index is more uniform over the waveguide region. These features impart desirable properties to the photoinduced waveguides. The more uniform lateral refractive index profile generated by the 'doughnut' mode beam, has several technical advantages when compared with LDW systems using Gaussian modes.

A practical consideration related to the general use of all PLC's is that it is usual for the input and output ports to be connected to the rest of the optical network with silica optical fibres. For maximum optical power transfer from the fibre to the channel waveguides comprising the PLC, the spot size and symmetry of the channel guided mode must equal that of the circularly symmetric fibre guided mode. For a given material system with a specified $F_{sat}$ this excitation efficiency criterion determines the dimensions of the channel waveguides. If the channel waveguides produced using either $TEM_{00}$ or $TEM_{01}*$ mode LDW must have mode sizes that are matched to those of a typical communications fibre, and the same maximum exposure of the photosensitive layer is used for both $TEM_{00}$ and $TEM_{01}*$ LDW, then a larger diameter writing beam is required in the $TEM_{00}$ case. This is because, as shown in FIG. 5, the photoinduced refractive index changes are low in the outer regions of the beam for $TEM_{00}$ exposure. The waveguide must therefore be made physically wider to pull the optical field out to match the fibre mode field size.

In the weak guidance regime, the mode effective index can be approximated as a weighted average of the refractive index distribution, $n(x,y)$, seen by the mode, i.e.

$$N_{eff}^2 \approx \frac{\iint n^2(x,y)\psi^2(x,y)\,dx\,dy}{\iint \psi^2(x,y)\,dx\,dy} \quad (3)$$

where $\psi(x,y)$ is the mode function. Evaluating equation (3) for both the $TEM_{00}$ and $TEM_{01}^*$ cases gives a lower effective index value in the $TEM_{00}$ case. Expressing this in terms of the normalized effective index, B, defined as;

$$B = \frac{N_{ef}^2 - n_{cl}^2}{n_{co}^2 - n_{cl}^2} \quad (4)$$

where $n_{cl}$ is the cladding refractive index and $n_{co}$ is the maximum photoinduced refractive index, gives a B value typically 20% higher in the $TEM_{01}^*$ case. The channel guided light is, therefore, more strongly confined in $TEM_{01}^*$ written waveguides, under the constraints of maximum excitation efficiency and $F_{max}=F_{sat}$. The stronger confinement imparts significant technical advantages for the $TEM_{01}^*$ written waveguides.

Figure 6:
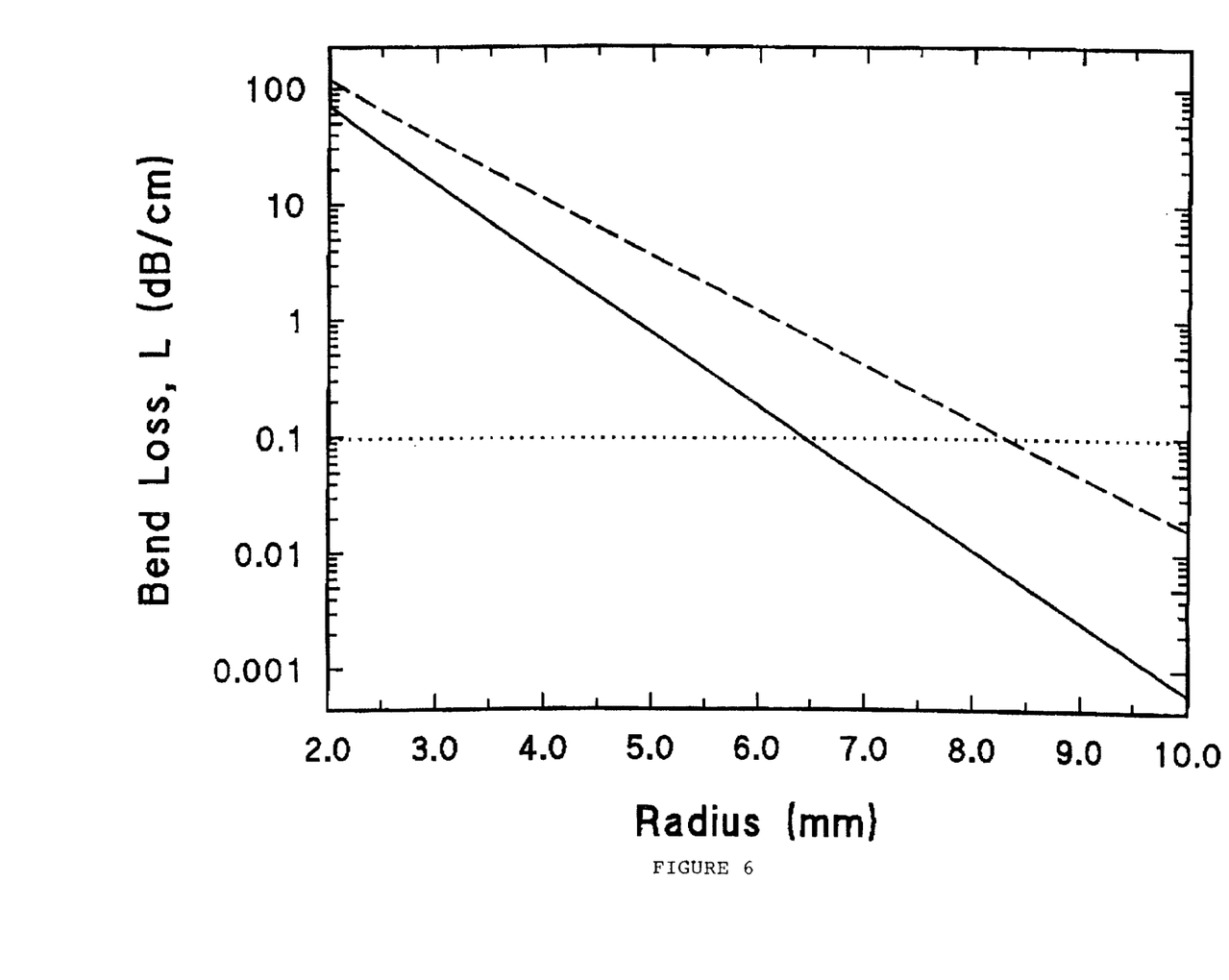
FIG. 6 illustrates bend loss for $TEM_{01}*$ (solid line) and $TEM_{00}$ (dashed line) written waveguides of equal spot size and maximum exposure.

Useful functionality is only achieved in a PLC if the channel waveguides are routed in curved paths from one region of the optical chip to another, and this requires bending of the waveguides in the plane of the film. When a channel waveguide is bent, an amount of power, L, is inescapably lost to radiation per unit length of bend. L is strongly dependent upon the radius of curvature of the bend; the tighter the bend, the greater the bend loss. For a constant radius, the magnitude of L is directly related to how strongly the guided mode is confined. Channel waveguides produced by $TEM_{01}^*$ LDW, therefore, exhibit significantly reduced bend loss compared to channel waveguides formed by $TEM_{00}$ LDW. This feature is illustrated in FIG. 6. The minimum bend radius (for 0.1 dB/cm bend loss) permissible for a $TEM_{01}^*$ written guide may be as small as ~75% the value of that possible using waveguides written by $TEM_{00}$ mode beams. This significantly impacts the device density on the planar waveguide typically increasing by a factor of 1.8 the number of devices that can be written on a given area of the optical "chip".

In addition, the index profiles generated through $TEM_{01}^*$ LDW result in channel waveguides with form birefringence reduced by typically a factor of 2 relative to $TEM_{00}$ written guides.

Variations in laser intensity or writing velocity (and therefore exposure) during the laser direct writing process will result in fluctuations in the effective index of the optical guided mode. In the case of $TEM_{01}^*$ LDW these fluctuations produce a comparatively smaller change (by typically a factor of 2) in effective index and hence the required tolerance on exposure is increased.

The emergence of wavelength division multiplexing (WDM) as the method of choice for expanding the bandwidth of existing optical networks means that spectrally selective elements are often required in PLC's. In many cases the required PLC functionality is acquired by photo defining Bragg reflection phase gratings into the existing PLC channel waveguides. In this case the $TEM_{01}^*$ and $TEM_{00}$ channel waveguide exposure conditions would be determined such that the maximum exposure did not completely saturate the available photoinduced refractive index change i.e. $F_{max}=0.7F_{sat}$ for example. For efficient Bragg reflection to occur the photoinduced phase grating should be written uniformly across the waveguide, requiring a uniform index distribution, $n(y)$, in the channel waveguide. Clearly channel waveguides produced by $TEM_{01}^*$ LDW satisfy this criterion better than channel waveguides formed by $TEM_{00}$ LDW.

It will be apparent that the application of the method of this invention to direct writing of channel optical waveguides provides a number of advantages over previously known techniques. These include:

a near-uniform lateral refractive index profile.

reduced bend loss in the laser written optical waveguides.

reduction in the effect of exposure fluctuations on waveguide parameters.

reduction of form birefringence in laser written optical waveguides.

the ability to write laterally uniform Bragg graftings by post photodefinition.

the availability of photoinduced tuning of the waveguide effective index.

the ability to produce optical waveguides with X-junctions requiring double the single mode core refractive index in the crossing region.

uniform exposure of photosensitive thin films.

The foregoing describes only some of the variations within the scope of this invention and further modification can be made without departing from the scope of the invention.

What is claimed is:

1. A method of directly producing photoinduced changes in refractive index in selected regions of a photosensitive thin film by selectively scanning a laser beam across the surface of the film, characterized in that the laser beam impinging the film has an annular substantially circularly symmetric irradiation intensity distribution.

2. A method as claimed in claim 1 wherein the radial intensity distribution across the annulus substantially uniform.

3. A method as claimed in claim 1 wherein the annular distribution is provided by a $TEM_{01}^*$ laser beam.

4. A method as claimed in claim 1 including the step of producing the $TEM_{01}^*$ laser from a Gaussian laser beam using a diffracting phase mask technique.

5. A method as claimed in any one of claims 1 and 4 wherein the film is a planar waveguide and including the step of scanning said laser beam so that said photoinduced changes produce one or more channel waveguides in the photosensitive film to create a planar lightwave circuit.

6. A method as claimed in claim 5 wherein said waveguides have modes sizes substantially matched to those of a typical communications optical fibre.

7. A method as claimed in claim 5 wherein at least one waveguide includes a curved path.

8. A method as claimed in claim 5 including the step of not completely saturating the available photoinduced refractive index change to provide for subsequent selective photoinduced refractive index changes to a portion of or portions of the waveguide.

9. A method as claimed in claim 8 including the step of producing said subsequent selective changes to define spectrally selective elements.

* * * * *

UNITED STATES PATENT AND TRADEMARK OFFICE
CERTIFICATE OF CORRECTION

PATENT NO. : 6,577,799 B1
DATED : June 10, 2003
INVENTOR(S) : Robbie Charters, Barry Luther-Davies and Francois Ladouceur It is certified that error appears in the above-identified patent and that said Letters Patent is hereby corrected as shown below:

<u>Title page,</u>
Item [30], Foreign Application Priority Data, delete "4465/98" add -- PP4465/98 --

Signed and Sealed this

Thirtieth Day of December, 2003

JAMES E. ROGAN
*Director of the United States Patent and Trademark Office*